United States Patent [19]

Asahara

[11] 4,060,422
[45] Nov. 29, 1977

[54] SEALING GLASS FOR GLASS LASER

[75] Inventor: Yoshiyuki Asahara, Higashiyamato, Japan

[73] Assignee: Hoya Corporation, Tokyo, Japan

[21] Appl. No.: 748,444

[22] Filed: Dec. 8, 1976

[30] Foreign Application Priority Data

Dec. 9, 1975 Japan .................................. 50-146757

[51] Int. Cl.² ............................................... C03C 3/16
[52] U.S. Cl. ................................. 106/47 Q; 106/47 R
[58] Field of Search ............................ 106/47 R, 47 Q

[56] References Cited

U.S. PATENT DOCUMENTS 3,885,974  5/1975  Asahara et al. .................... 106/47 Q
3,966,447  6/1976  Asahara et al. .................... 106/47 R Primary Examiner—Winston A. Douglas
Assistant Examiner—Mark Bell
Attorney, Agent, or Firm—Sughrue, Rothwell, Mion, Zinn and Macpeak

[57] ABSTRACT

A sealing glass for a glass laser having a composition comprising 45 to 65% by mole $P_2O_5$, 15 to 35% by mole ZnO, 5 to 25% by mole PbO, 4 to 12% by mole $Li_2O$, 1 to 4% by mole $Al_2O_3$, 0 to 7% by mole $Sb_2O_3$, 0 to 5% by mole $Ag_2O$, and 2.0 to 10% by mole $V_2O_5$, and having a low refractive index and capable of absorbing infrared rays.

1 Claim, 1 Drawing Figure

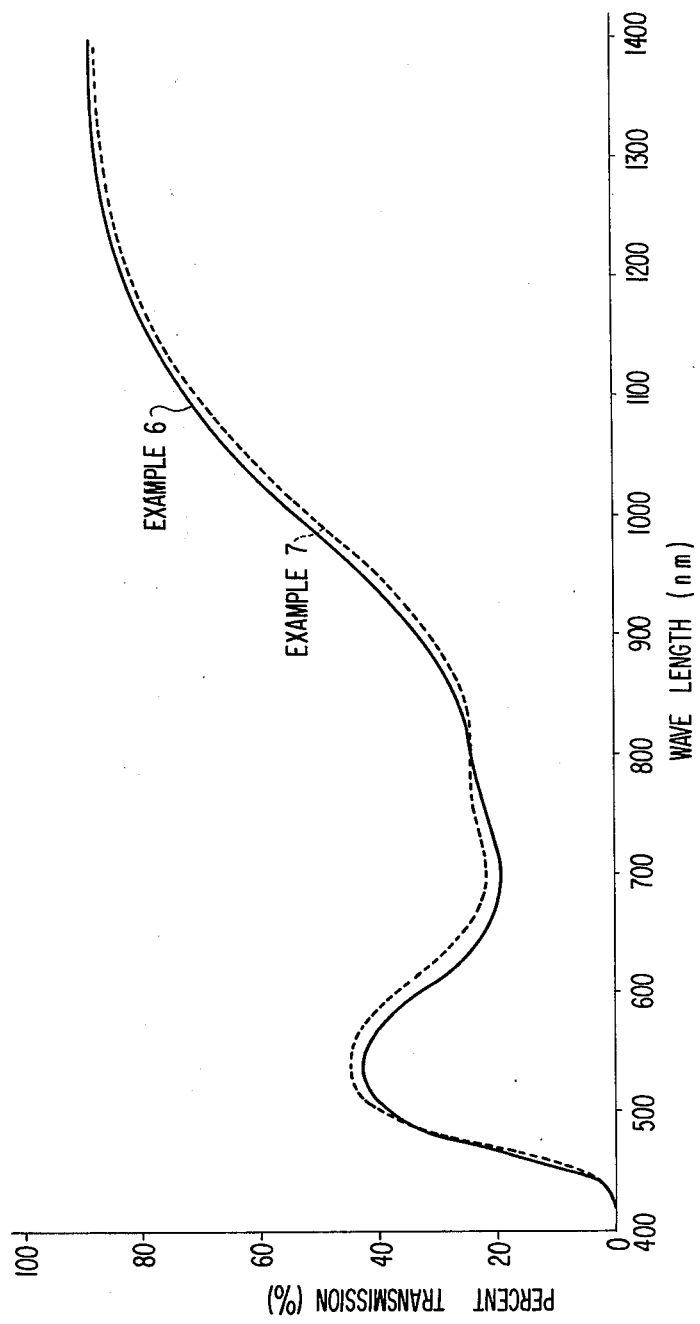

SEALING GLASS FOR GLASS LASER

BACKGROUND OF THE INVENTION

1. Field of the Invention

This invention relates to a low melting glass having a low refractive index and an absorption in infrared regions for glass laser coating.

2. Description of the Prior Art

Recently, it was reported that the oscillation characteristics of a laser glass disc could be improved by coating the outer side of the laser glass disc with a thin layer of glass, thereby reducing the light scattered by the inside wall of the disc, and absorbing the light by the thin layer of glass.

Sealing glasses used for this purpose must have the following characteristics. That is, the sealing glass must have an expansion coefficient, α, equivalent to that required in a conventional sealing glass and the glass must be capable of sealing at a temperature lower than the transition temperature, Tg, of the laser glass in order to not change the characteristics of the laser glass at sealing. Furthermore, a sealing glass must absorb light having a definite wave length (e.g., 1.06 microns in the case of a glass laser where the glass contains Nd) and further must sufficiently meet refractive index requirements. For example, in order to prevent reflection at the inside wall of a Nd laser glass disc, the sealing glass used must, as a matter of course, have absorbtion at 1.06 microns and further for effectively preventing reflection, it is believed to be better that the refractive index of the sealing glass be higher than the refractive index (1.55-1.60) of a conventional silicate laser glass and also the difference be as low as possible (a difference of less than 10%). Moreover, as the size of a laser glass disc increases, the amount of light passing through the glass increases, and hence the difference between the refractive index of the laser glass and that of the low melting glass must be small (a difference of less than 5%). Still further, since a laser glass having a lower refractive index (1.54-1.53) is required to reduce the self-focusing effect of the laser glass, the low melting glass used as the sealing glass must also have a lower refractive index.

Therefore, in order that the characteristics of a laser glass at sealing not be changed, the sealing glass used must, as a matter of course, have a sealing temperature lower than the transition temperature, Tg, of the laser glass.

Ordinary low melting glasses used conventionally for this purpose are substantially $B_2O_3$—$Tl_2O$—$ZnO$ glasses and $B_2O_3$—$PbO$—$ZnO$ glasses and if these glasses are modified to have a softening point (Sp) of about 400° to 500° C and an expansion coefficient of $100 \pm 20 \times 10^{-7}/°$ C, it is assumed that the refractive index (nd) of these glasses will be higher than 1.8 to 1.9, which is a drawback of these conventional low melting glasses.

SUMMARY OF THE INVENTION

An object of this invention is, therefore, to provide a sealing glass for a glass laser meeting the above-described requirements.

A particular object of this invention is to provide a sealing glass having a low melting point, e.g., 350° to 450° C, a low refractive index, e.g., 1.63 to 1.55, an expansion coefficient of about $100 \pm 20 \times 10^{-7}/°$ C, and absorbtion in the infrared regions.

As the result of various investigations, it has now been found that the above object of this invention is attained by adding $Li_2O$, $V_2O_5$, and $Al_2O_3$ together with, if necessary, $Sb_2O_3$ and $Ag_2O$, to a $P_2O_5$—$ZnO$—$PbO$ base glass.

That is, this invention provides a sealing glass for a glass laser comprising 45 to 65% $P_2O_5$, 15 to 35% ZnO, 5 to 25% PbO, 4 to 12% $Li_2O$, 1 to 4% $Al_2O_3$, 0 to 7% $Sb_2O_3$, 0 to 5% $Ag_2O$, and 2.0 to 10% $V_2O_5$, in which the percentages are by mole.

BRIEF DESCRIPTION OF THE DRAWING

The FIGURE shows curves demonstrating the transmission of the sealing glasses illustrated in the examples of this invention.

DETAILED DESCRIPTION OF THE INVENTION

Since in the sealing glass of this invention, $P_2O_5$ is employed as the main component of the glass composition, the sealing glass of this invention has the advantage that a large amount of $V_2O_5$, which is an infrared absorbing component, can be present therein.

Now, several examples of the sealing glass of this invention are shown in the following tables together with a comparison example and the features of this invention will be explained by reference to these examples.

Further, in the following examples (and for the glass of this invention in general), the raw materials for the components of the glass in the form of their oxides or salts were mixed and then melted and heated at 1000°-1200° C for 1 to 2 hours in an aluminum crucible. The molten glass was then cast into a metallic mold followed by cooling in air.

| Example No. | Composition (mole%) | | | | | | | |
|---|---|---|---|---|---|---|---|---|
| | $P_2O_5$ | ZnO | PbO | $Li_2O$ | $Al_2O_3$ | $Sb_2O_3$ | $Ag_2O$ | $V_2O_5$ |
| 1 | 53.2 | 16.0 | 21.3 | 5.3 | 2.1 | — | — | 2.1 |
| 2 | 53.2 | 21.3 | 10.6 | 10.6 | 2.1 | — | — | 2.1 |
| 3 | 53.2 | 21.3 | 10.6 | 5.3 | 2.1 | 5.3 | — | 2.1 |
| 4 | 63.8 | 16.0 | 10.6 | 5.3 | 2.1 | — | — | 2.1 |
| 5 | 48.1 | 28.8 | 4.8 | 4.8 | 1.9 | — | 1.9 | 9.6 |
| 6 | 51.5 | 30.9 | 5.2 | 5.2 | 2.1 | — | — | 5.2 |
| 7 | 50.5 | 30.3 | 5.1 | 5.1 | 2.0 | — | 2.0 | 5.1 |
| 8 | 50.0 | 25.0 | 10.0 | 5.0 | 2.0 | — | 3.0 | 5.0 |
| Comp. Example | 53.2 | 21.3 | 21.3 | — | 2.1 | — | — | 2.1 |

| Example No. | nd | Expansion Coefficient($\times 10^{-7}/°$ C) | Tg | Sp |
|---|---|---|---|---|
| 1 | 1.626 | 103 | 330° C. | 365° C. |
| 2 | 1.575 | — | — | — |
| 3 | 1.618 | 101 | 365° C. | 409° C. |

| | | -continued | | |
|---|---|---|---|---|
| 4 | 1.581 | — | — | — |
| 5 | 1.584 | — | — | — |
| 6 | 1.565 | 92 | 395° C. | 430° C. |
| 7 | 1.572 | 97 | 375° C. | 419° C. |
| 8 | 1.600 | 102 | 358° C. | 392° C. |
| Comp. Example | 1.618 | 110 | 354° C. | 398° C. |

Note: where no values are given above, measurement was impossible.

The presence of $Li_2O$ in the sealing glass of this invention gives a remarkable advantage to the glass. That is, as is clear from the results of the Comparison Example and Example 1, the addition of $Li_2O$ can reduce the softening point of the glass without increasing the refractive index very much.

In the sealing glass of this invention, if the content of $P_2O_5$ is lower than 45% by mole, the properties of the glass becomes unstable due to the deficiency of the glass forming component, while if the content of $P_2O_5$ is higher than 65% by mole, the chemical durability of the glass is reduced and at the same time the softening point, Sp, of the glass becomes higher.

The proportions of ZnO and PbO in the glass composition of this invention can be replaced by each other to some extent but if the content of ZnO is lower than 15% by mole and the content of PbO is higher than 25% by mole, the refractive index of the glass becomes too high, while if the content of ZnO is higher than 35% by mole and the content of PbO is lower than 5% by mole, the softening point, Sp, of the glass becomes high.

To maintain a low refractive index the proportion of $Li_2O$ must be higher than 4% by mole but if the proportion of $Li_2O$ is higher than 12% by mole, devitrification of the glass is easy.

$Al_2O_3$ is a component for rendering the glass chemically durable but since the addition of a too large an amount of $Al_2O_3$ also increases the softening point of the glass, the proportion of $Al_2O_3$ is properly 1 to 4% by mole.

PbO may be replaced by $Sb_2O_3$ but if the proportion of $Sb_2O_3$ is over 7% by mole, the refractive index of the glass becomes too high.

Also, $Ag_2O$ may be added up to 5% by mole for reducing the softening point of the glass but if the proportion of $Ag_2O$ is over 5% by mole, the refractive index of the glass increases.

It is inevitable that $V_2O_5$ be present in an amount of higher than 0.2% by mole as an infrared absorbing component but if the proportion of $V_2O_5$ is over 10% by mole, the softening point of the glass becomes undesirably high.

The sealing glass of this invention having the above described composition possesses the characteristics that the refractive index of the glass ranges from 1.63 to 1.55 and the softening point thereof ranges from 350° to 450° C., which properties are sufficient for performing the sealing at a temperature of 450° to 550° C.

As is clear from the percent transmission curves of the sealing glass of this invention in Example 6 (thin layer of 0.14 mm.) and the sealing glass of this invention in Example 7 (thin layer of 0.125 mm.) illustrated in the FIGURE of the accompanying drawing, the infrared absorptions by $V_2O_5$ and the percent transmittance are much lower in the range of from 600 mm. to 1100 mm. in both cases.

While the invention has been described in detail and with reference to specific embodiments thereof, it will be apparent to one skilled in the art that various changes and modifications can be made therein without departing from the spirit and scope thereof.

What is claimed is:

1. A sealing glass for a glass laser comprising, in mole percent, 45 to 65% $P_2O_5$, 15 to 35% ZnO, 5 to 25% PbO, 4 to 12% $Li_2O$, 1 to 4% $Al_2O_3$, 0 to 7% $Sb_2O_3$, 0 to 5% $Ag_2O$, and 2.0 to 10% $V_2O_5$.

* * * * *